(12) United States Patent
Hayakawa (10) Patent No.: US 12,439,904 B2
(45) Date of Patent: Oct. 14, 2025

(54) LURE HOLDER WITH RESILIENT FOLDING TABS

(71) Applicant: Ryoke Co., Ltd., Kawaguchi (JP)

(72) Inventor: Taiichiro Hayakawa, Kawaguchi (JP)

(73) Assignee: Ryoke Co., Ltd., Kawaguchi (JP)

( * ) Notice: Subject to any disclaimer, the term of this patent is extended or adjusted under 35 U.S.C. 154(b) by 7 days.

(21) Appl. No.: 18/385,757

(22) Filed: Oct. 31, 2023

(65) Prior Publication Data

US 2024/0324570 A1    Oct. 3, 2024

(30) Foreign Application Priority Data

Mar. 23, 2023 (JP) ................................. 2023-47038

(51) Int. Cl.
*A01K 97/06* (2006.01)
(52) U.S. Cl.
CPC .................................... *A01K 97/06* (2013.01)
(58) Field of Classification Search
CPC .............................. A01K 97/06; A01K 87/009
See application file for complete search history.

(56) References Cited

U.S. PATENT DOCUMENTS

| 542,394 A | * | 7/1895 | Mills | A01K 97/06 229/87.01 |
|---|---|---|---|---|
| 685,952 A | * | 11/1901 | Sullivan | A01K 97/06 43/57.1 |
| 786,352 A | * | 4/1905 | Frost | A01K 97/06 43/57.1 |
| 1,365,111 A | * | 1/1921 | Lawrence | A01K 97/06 43/57.1 |
| 1,788,674 A | * | 1/1931 | Hughes | A01K 97/04 43/57.1 |
| 4,936,040 A | * | 6/1990 | Reiter | A01K 97/06 43/25.2 |

(Continued)

FOREIGN PATENT DOCUMENTS

JP    3235448 U    12/2021

OTHER PUBLICATIONS

Pillow Boxes; https://www.amazon.com/ISKYBOB-Plastic-Pillow-Transparent-Packing (Year: 2019).*

*Primary Examiner* — Jessica B Wong
(74) *Attorney, Agent, or Firm* — Barry L. Davison; Davis Wright Tremaine LLP (57) ABSTRACT

Provided are lure holders configured to provide for easy insertion and removal of lures, and to increase safety by preventing lures (e.g., metal jigs) from sticking out. The lure holder comprises first and second plate portions, each having an elongated plate shape and made of elastic material. The first and second plate portions are connected to each other by their longitudinally extending edges to form a tube having a spindle-shaped cross-section, and open at both tube ends. One of the first plate and the second plate has a plurality of elastic tongues extending from one end of the tube, and reversibly foldable into the interior of the tube. The tongues, in folded form, progressively overlap each other with increased curvature of the tube, increasing the collective rigidity of the tongues. Tongue embodiments configured for enhanced draining are provided. Kits and combinations comprising the lure holders are also provided.

18 Claims, 9 Drawing Sheets

(56) References Cited

U.S. PATENT DOCUMENTS

| | | | | |
|---|---|---|---|---|
| 5,277,306 | A | * | 1/1994 | Sargent .................. A01K 97/08 206/315.11 |
| 5,297,354 | A | * | 3/1994 | McGriff ................. A01K 97/06 43/55 |
| 5,394,638 | A | * | 3/1995 | Raymond ............. A01K 97/06 43/57.1 |
| 5,992,082 | A | * | 11/1999 | Barefoot ................ A01K 97/06 43/25.2 |
| 6,574,906 | B1 | * | 6/2003 | Meier .................... A01K 97/06 43/25.2 |
| D526,041 | S | * | 8/2006 | Meier ......................... D22/134 |
| 9,538,737 | B2 | * | 1/2017 | Jubinville ............. A01K 97/06 |
| 2002/0116861 | A1 | * | 8/2002 | Stockdale ............. A01K 87/00 43/25.2 |
| 2015/0282468 | A1 | * | 10/2015 | Jubinville ............. A01K 97/06 43/54.1 |
| 2017/0172132 | A1 | * | 6/2017 | Romanus ............... B65D 75/06 |

* cited by examiner

LURE HOLDER WITH RESILIENT FOLDING TABS

CROSS REFERENCE TO RELATED APPLICATION

This application claims priority to Japanese Patent Application No. 2023-47038, filed Mar. 30, 2023, entitled "LURE HOLDER," the disclosure of which is incorporated herein by reference in its entirety.

FIELD OF THE INVENTION

Aspects of the invention relate generally to lure holders, and more particularly to lure holders configured to provide for easy insertion and removal of lures, and to enhance safety by preventing held lures (e.g., even heavy metal jigs, etc.) from sticking out.

BACKGROUND

Conventional lure holders for holding a lure in a case are known in the art. The lure holder described in Japanese Utility Model Registration No. 3235448 (the '448 Registration), for example, has a tubular/cylindrical shape with a spindle-shaped cross section, and holds the lure. A lure inserted into the holder is held by elastic force of the tube/cylinder. Insertion of the lure into the lure holder from an end of the tube/cylinder is easily facilitated by opening/unfolding the tube with one hand. After the lure is placed in the tube the hand is released, the tube narrows, and the lure is held in the tube. Insertion and removal of the lure is easy and safe.

Lures may be made of heavy materials such as lead an tungsten, intended for increasing flight distance and rapid diving. Additionally, large and heavy metal jigs are used for aiming at big things. In such cases, the lure holder described in the '448 Registration lacks sufficient protection and holding power to prevent protrusion of heavy lures from the holder. In order to prevent a heavy lure from sticking out, one end of the tube for the lure holder of the '448 Registration may be closed. However, closing one end of the tube would prevent the opening and closing of the lure holder, thereby interfering with insertion and removal of the lure. For this reason, it would be desirable to have a lure holder structure that prevents the even heavy lures from sticking out without hindering insertion and withdrawal of the lure.

DETAILED DESCRIPTION

Lure Holders

Provided are lure holders configured to provide for easy insertion and removal of lures, and to prevent held jigs (e.g., metal jigs) from sticking out. For achieving these objectives, the provided lure holders have an elongated plate shape, and are made of an elastic material. More specifically, the lure holders comprise a first plate portion having an elongated plate shape and made of elastic material, and a second plate portion having an elongated plate shape and made of elastic material. The first and second plate portions are connected to each other along their longitudinally extending edges to form a tube/cylinder having a spindle-shaped cross-section, and open at both tube/cylinder ends. One of the first plate and the second plate has a plurality of tongues extending from one end of the tube/cylinder and foldable into the interior of the tube/cylinder, such that even heavy lures (e.g., metal jigs) are held in the lure holder by the tongues. Moreover, since the tongues do not interfere with opening and closing of the tube, the lure can be easily inserted and removed from the lure holder (e.g., by application and release of hand pressure at the opposing joined edges of the spindle-shaped cross-section to expand and contract the open ends of the tube/cylinder).

While the lure holder may have three or more tongues, embodiments having two tongues are preferred. The elastic tube/cylinder is easy to bend between the two tongues, and when the tube/cylinder is opened (by application of hand pressure at the opposing joined edges of the spindle-shaped cross-section), the two folded tongues (e.g., in two-tongue embodiments) overlap and cross each other, such that heavy lures (e.g., metal jigs, etc.) are retained within the holder by the tongues. In this manner, the lure can be easily held in the holder, even when it is being inserted into the lure holder.

In preferred lure holder embodiments, at least one of the first plate portion and the second plate portion is transparent. For example, the lure holder, or at least one plate portion thereof, is preferably made of a clear resin material. By using a transparent resin material, a user can easily observe and check the lure inside the lure holder, and it is difficult for the lure hook(s) to stick/penetrate, so the user can avoid being stuck by the hook, and safely hold the lure within the lure holder. Use of such resin material also allows for washing (e.g., with water) of the lure within the lure holder.

In preferred lure holder embodiments, the edge of the tube/cylinder end opposite the end having the tongues is tilted/slanted/angled with respect to the longitudinal direction of the plate portions to effectively enlarge the end opening area at the slanted end, facilitating insertion of the lure. Preferably, the slanted edge of the tube/cylinder end opposite the end having the tongues may take the form an opening with a convex (longitudinally away/outside from the tube/cylinder) curved rim, providing a wide receiving area that facilitates easier insertion of the lure.

The tongues of the lure holder, in unfolded embodiments, protrude in the longitudinal direction outside of the tube/cylinder. A fold line or cut line (e.g., notch, groove, score line) is provided at a position where each tongue is connected to the tube/cylinder, making it easier to bend the tongue into the interior of the tube/cylinder, or to facilitate excision of the tongue(s) if not needed. In preferred embodiments, there is a first tongue portion connected to the tube/cylinder that protrudes in the longitudinal direction outside of the tube/cylinder, and a second tongue portion connected to the first tongue portion, which second tongue portion may be folded back to the inside of the tube/cylinder. In such folded embodiments, the configuration of the connection between the first tongue portion and the second folded tongue portion protrudes in the longitudinal direction outside of the tube/cylinder, providing a connecting hole/channel at the base of the tongue outside the tube/cylinder that facilitates draining (e.g., water), such that the lure and/or holder can be easily washed and drained.

In the lure holders, the length of the tube/cylinder in the longitudinal direction is preferably at least five times the width. By having a long shape (e.g., that is 5 times or more the width), a relatively shorter lure expanding the lower part of the elastic tube naturally tends to narrow the top part of the tube, effectively making it smaller than the bottom part. Consequently, sliding of even heavy lures such as metal jigs out the top end part of the tube is thereby suppressed (by the lure-induced narrowing).

First Embodiment

A first embodiment of the present invention will be described below with reference to the drawings.

Figure 1:
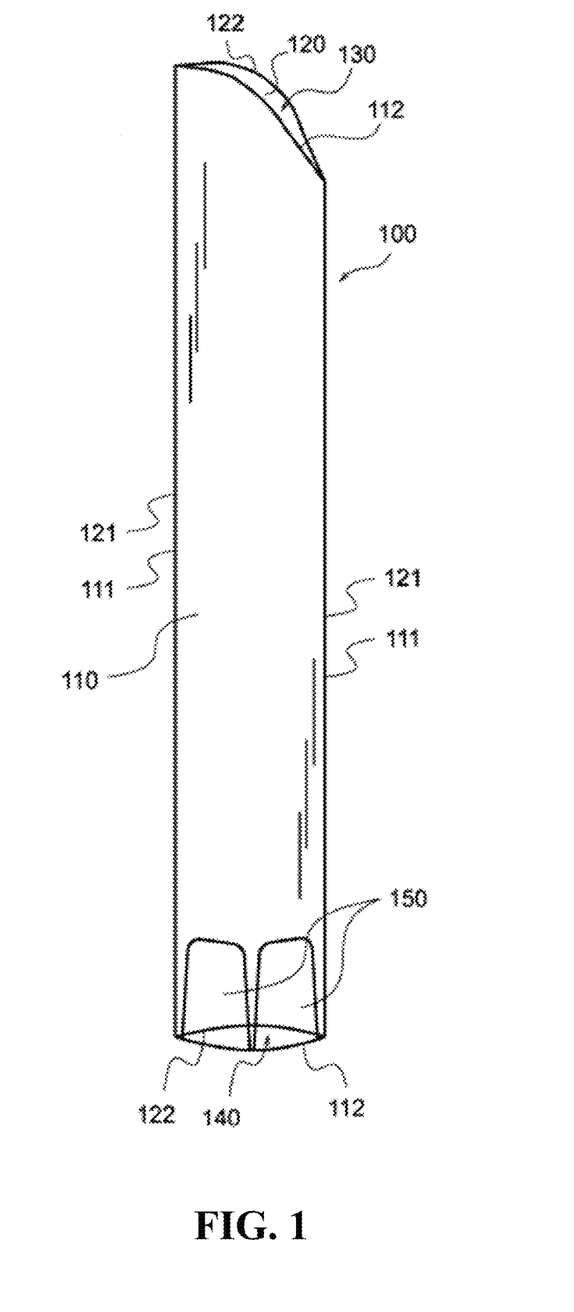
FIG. 1 is a front view showing a first embodiment of a lure holder 100 of the present invention.
Figure 2:
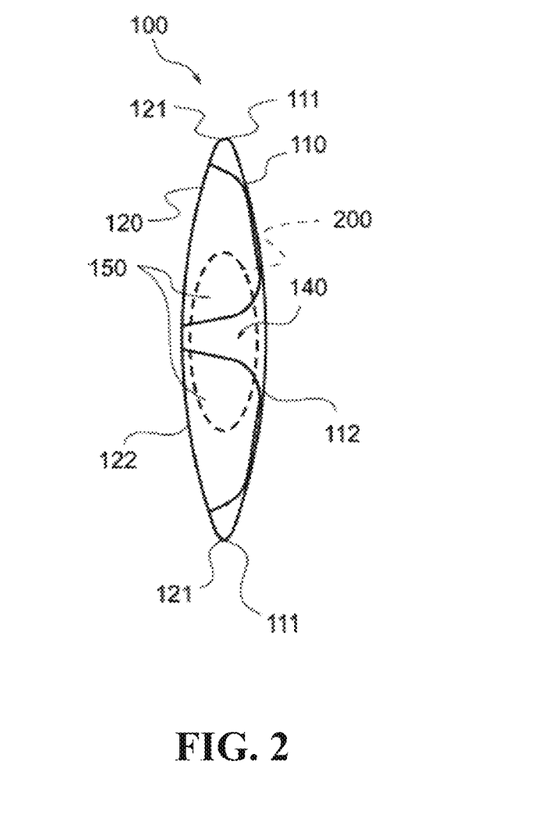
FIG. 2 is a bottom view showing the first embodiment of the lure holder 100 of the present invention.
Figure 3:
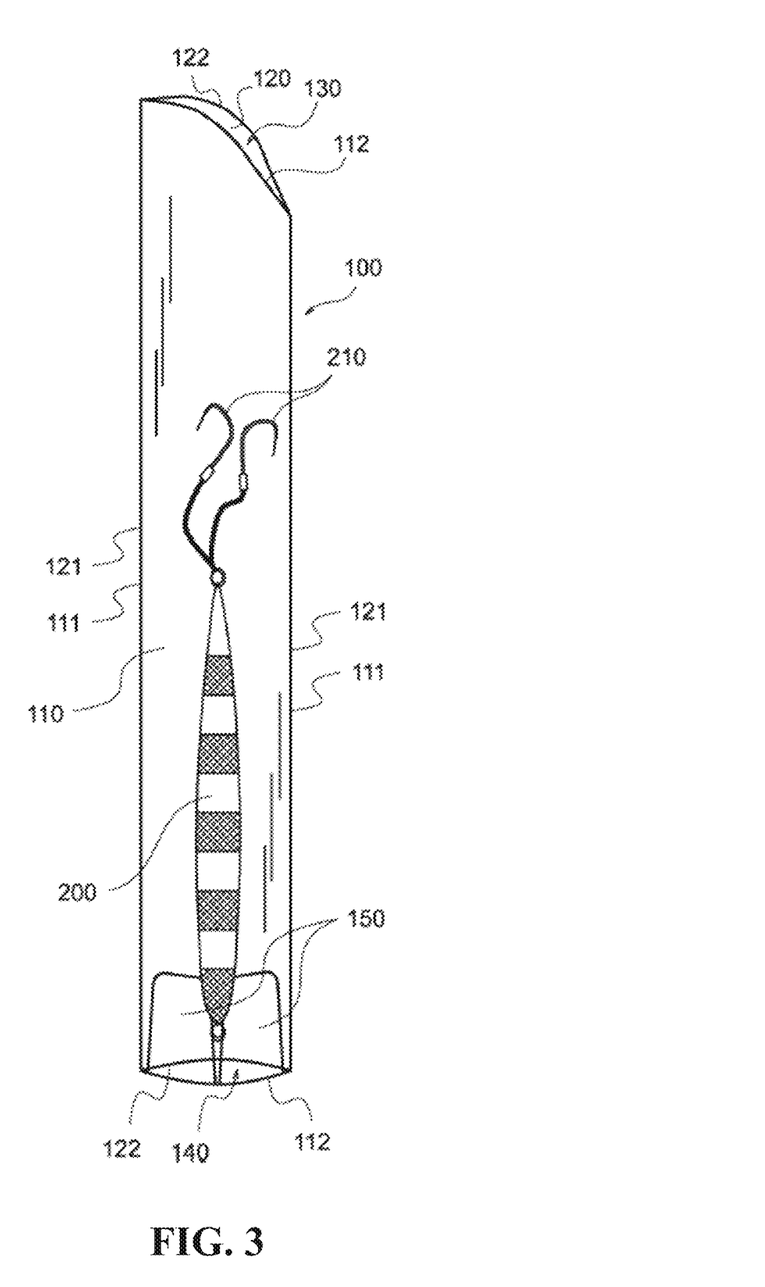
FIG. 3 is a diagram showing a state in which a lure 200 is housed.

FIG. 1 is a front view showing a first embodiment of the lure holder 100 of the present invention, and FIG. 2 is a bottom view showing the first embodiment of the lure holder 100, and FIG. 3 shows a state in which a lure 200 is accommodated therein. Lure holder 100 of this embodiment has, for example, an elongated shape in the vertical direction of FIG. 1, referred to in the following description for convenience as the "longitudinal direction," and the left and right directions in FIG. 1. Transparent plate 110 is referred to as the "top side," and a second transparent plate 120 is referred to as the lower or "bottom side."

The first transparent plate 110 and the second transparent plate 120 are the first plate portion and the second plate portion referred to in the present invention, and have a plate shape, for example, elongated in the vertical direction of FIG. 1. The first transparent plate 110 and the second transparent plate 120 have longitudinally extending edges 111, 121, respectively. Lure holder 100 has end edges 112, 122 extending in intersecting directions. The first transparent plate 110 and the second transparent plate 120 are attached to each other at edges 111 and 121, respectively, extending in the longitudinal direction, providing a connected, tubular structure.

The end edges 112 and 122 of first transparent plate 110 and second transparent plate 120 are not connected to each other. First, the lure holder 100 has a top opening 130 and a bottom opening 140. In other words, both ends of the tube of the lure holder 100 are open. The edges 112 and 122 on the top end are tilted with respect to the longitudinal edges 111, 121 that extend in the longitudinal direction. Further, the edges 112 and 122 on the top end have a curved convex shape.

As shown in FIG. 2, the cross section of the tube/cylinder of the lure holder 100 is fusiform (spindle-shaped), and the edges 111 and 121 where the first transparent plate 110 and the second transparent plate 120 are connected are pointed outward. The shape of the openings 130 and 140 also have a spindle shape when viewed in the longitudinal direction, but the top end opening 130 is angled with respect to the longitudinal direction as described above, such that in the wide open state, the top opening 130 is larger than the bottom opening 140.

The first transparent plate 110 and the second transparent plate 120 are made of, for example, transparent plastic, and are elastically deformable. A lure 200 is housed in the lure holder 100 as shown in FIG. 3. Due to the elastic force of the first transparent plate 110 and the second transparent plate 120, the lure 200 is held by the first transparent plate 110 and the second transparent plate 120. In the case of a light lure 200, the lure 200 is sandwiched between the transparent plates 110 and 120 with enough strength to prevent it from slipping out of the openings 130 and 140, such that lure 200 is held in the holder 100.

The lure 200 has a hook/needle 210, but the lure 200 is held within the tube/cylinder of the lure holder 100, such that the hook(s) 210 are prevented from touching/hitting the user's finger or the like, and entanglement of the hooks 210 between different lures 200 is prevented. It is possible, therefore, to store a plurality of lures 200 in a box or the like, where each lure 200 may be individually held in a respective lure holder 100, so that a plurality of lure holders 100 individually holding lures 200 can be easily organized and safe handling becomes possible. Since the holders 100 can be accommodated in a box or the like without being fixed to each other, they are able to accommodate a large number of lures 200 in a space-saving manner compared to cases with fixed holders.

In this embodiment, since the lure holder 100 is transparent, it is easy to confirm that lure 200 that has been held. Moreover, if the first transparent plate 110 and the second transparent plate 120 are made of resin such as plastic, the hook 210 is less likely to stick/lodge, and the lure holder 100 can also be washed with water. Such a structure in which both ends of the lure holder 100 are open also facilitates washing the lure 200 with water.

One of the transparent plates 110 and 120 of the lure holder 100 (for example, the first transparent plate 110) has a plurality (e.g., two in this embodiment) of tongues 150 connected to the bottom edge 112. In further embodiments, three or more tongues 150 may be provided. A representative shape of the tongue portion 150, is shown in FIG. 1. Although a tongue shape in which the tip side/end is slightly narrower than the base side is preferable, the shape is not limited to this exemplary shape. For example, the tip may be rounded in a semicircular shape, a semielliptical shape, a triangular shape, or it may be square trapezoidal, or rectangular with a constant width from the root side to the tip side.

Figure 4:
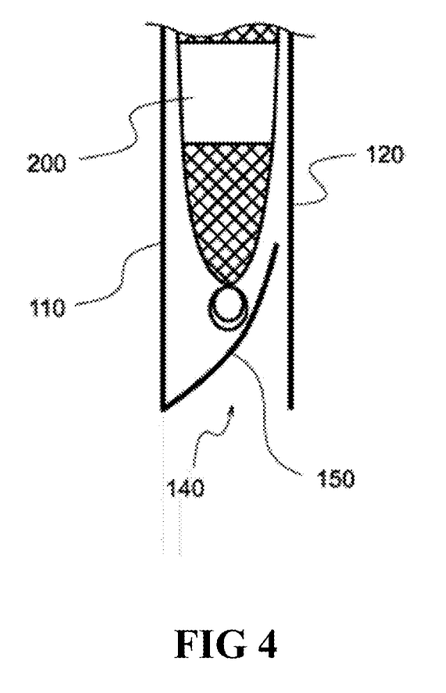
FIG. 4 is a schematic cross-sectional view of the vicinity of the tongue 150.

FIG. 4 is a schematic cross-sectional view of the vicinity of the tongue. The tongue portion 150 extends from the bottom opening 140 into the interior tube/cylinder of the lure holder 100 (i.e., between the two transparent plates 110, 120). The length of the tongue portion 150 is greater than the width of the tube of the lure holder 100. Since the lure 200 is also long, the tongue portion 150 supports the lure 200. For this reason, protrusion of even a heavy lure 200 such as a metal jig from the opening 140 (e.g., due to vibration, or the like) may be prevented. At the same time, the tongue portion 150 does not block the opening 140, for example, when washing the lure 200 with water, etc., since it is possible to conveniently drain water from the opening 140.

Figure 5:
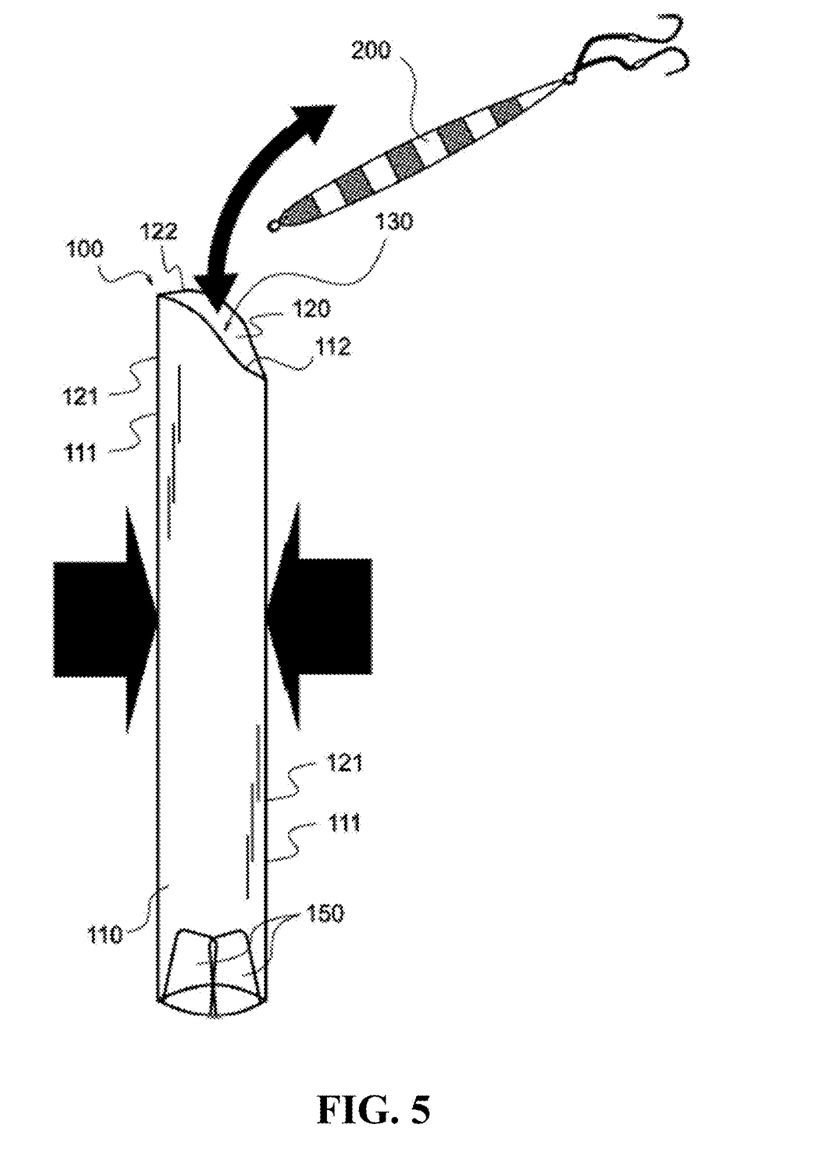
FIG. 5 is a diagram showing a method of inserting and removing a lure 200.

FIG. 5 is a diagram showing a method of inserting and removing a lure. When inserting the lure 200 into the lure holder 100, the user expands the tube/cylinder of the lure holder 100 by pressing from the outwardly pointed curved edges 111 and 121 of the spindle (that is, pressing inwardly from where the first transparent plate 110 and the second transparent plate 120 are connected). A user can perform this operation with one hand.

While the provided plurality of tongues 150 would be expected to stiffen/prevent the first transparent plate 110 from bending, the tube/cylinder of the lure holder 100 is yet easily expanded by the user's pressing force. For example, if two tongues 150 are provided, the user's pressing force (applied at the pointed curved edges 111 and 121) is concentrated between the two tongues 150, so the first transparent plate 110 yet bends and the tube of the lure holder 100 widens.

The user can hold the lure 200 with the other hand (as opposed to the hand pressing the lure holder 100). The lure 200 can be inserted into the lure holder 100 through the opening 130 on the top end. The top end opening 130 is tilted/inclined with respect to the longitudinal direction as described above, providing for a larger opening compared to non-tilted (e.g., perpendicular) opening, and making it easier to insert the lure 200 into the lure holder 100. Moreover, since the edges 112 and 122 of the top opening 130 have a curved shape convex to the top end, a wide receiving surface is generated when the top end opening 130 is opened, making insertion of the lure 200 easier.

Once the lure 200 has been inserted into the lure holder 100, the user can relax the pressing force previously applied to the lure holder 100. By relaxing the pressing force on the lure holder 100, the elastic force of the first transparent plate 110 and the second transparent plate 120 narrows the tube/cylinder of the lure holder 100, with the result that lure 200 is held within the lure holder 100. Even heavy lures 200 are reliably retained within the lure holder 100 by the tongue portion(s) 150. Preferably, the length of the tube/cylinder of the lure holder 100 in the longitudinal direction is at least five times the width, such that a shorter lure 200 expanding the lower part of the elastic tube naturally induces narrowing of top part of the tube, effectively making it smaller than the bottom part. Even a heavy lure 200 is thus prevented from sliding toward the top end.

Figure 6:
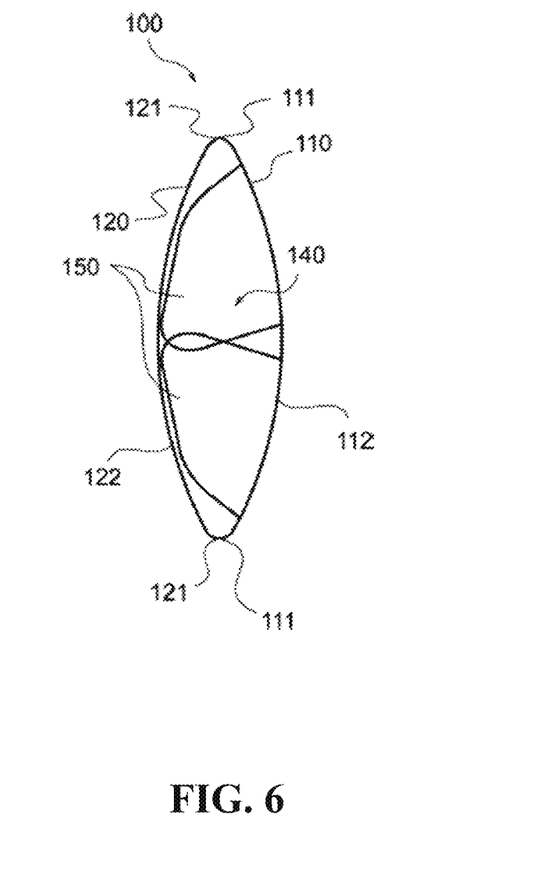
FIG. 6 is a diagram showing the state of the tongue 150 when the lure holder 100 is opened.

As shown in FIG. 6, when the tube/cylinder of the lure holder 100 is expanded, each of the plurality of tongues 150 rotates with the curvature of the first transparent plate 110, such that the tip sides/ends of the tongues 150 overlap each other and the rigidity of the entire/combined tongue portion(s) 150 is increased. For this reason, even if the lure 200 is inserted into the lure holder 100 with force and slips to the bottom end, the tongue(s) 150 securely retain the lure 200 in the lure holder 100. The user, therefore, can store the lure 200 in the lure holder by a simple operation.

Returning to FIG. 5, for removal of the lure 200 from the lure holder 100, the user applies pressure at the pointed edges of the spindle shape to expand the tube/cylinder of the lure holder 100. As a result, the holding force of the lure 200 by the holder 100 is loosened. Then, the user can easily take out the lure 200 by, for example, turning the top/front opening 130 downward. In this way, the user can easily reach the lure 200 without touching it, and the lure 200 can be safely taken out at any time.

Figure 7:
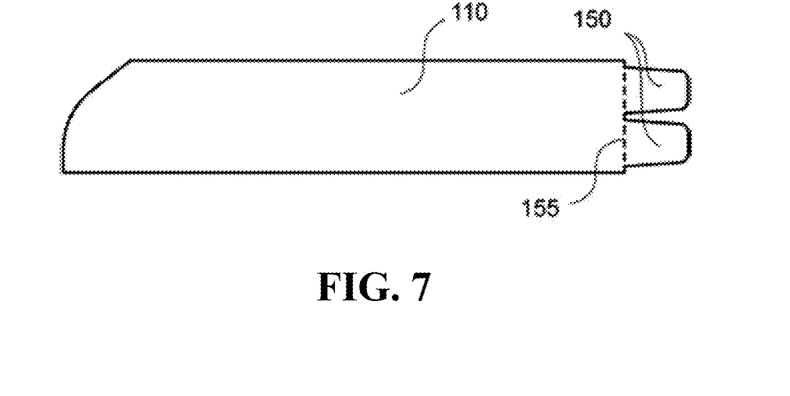
FIG. 7 is a diagram showing a state of the lure holder 100 before the tongue 150 is folded.

FIG. 7 is a diagram showing a state of the lure holder 100 before the tongue(s) 150 is/are folded in. The tongue portion 150 of the lure holder 100 is not folded into the tube/cylinder at the time of sale, for example, and extends from the bottom side/end of the first transparent plate 110, as shown in the figure. A dotted line-like cut/score/notch/groove 155 is provided at a place where tongue portion 150 connects to the bottom edge 112 of the tube/cylinder. This makes it easy to bend/fold the tongue portion 150, and/or facilitates removal/excision when the tongue portion 150 is not needed.

Figure 8:
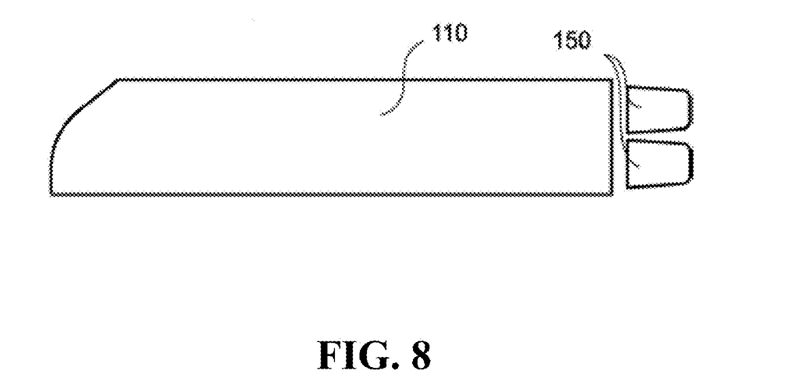
FIG. 8 is a diagram showing a state of the lure holder 100 in which the tongue 150 has been excised.

FIG. 8 is a diagram showing a state in which the tongue portion 150 has been excised. For example, if only a light lure 200 is to be held in the lure holder 100, the tongue(s) 150 becomes unnecessary. By cutting the first transparent plate 110 at the cut line 155, tongue(s) 150 is/are excised from the first transparent plate 110. As a result, the user can hold the lure holder 100, with the long direction in the vertical direction of gravity, and apply pressure to the pointed edges of the spindle shape to remove the lure 200 through either of the openings 130 or 140.

Second Embodiment

Next, a lure holder according to a second embodiment is described. The lure holder of the second embodiment, and the lure holder of the first embodiment are almost the same shape except that the structure near the base of the tongue is folded differently. The following description focuses on the differences between the first embodiment and the second embodiment. The same reference numerals are used for the common elements, and redundant explanations are omitted.

Figure 9:
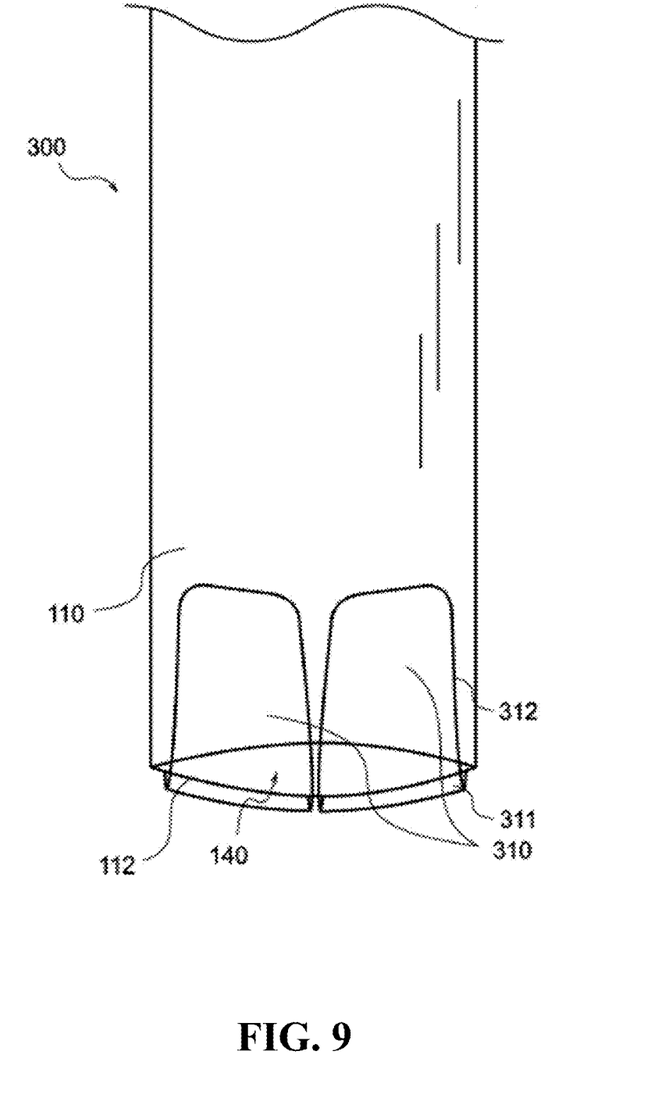
FIG. 9 is a partially enlarged view showing a second embodiment of the lure holder 300 of the present invention showing a tongue 310 having portions 311, 312.
Figure 10:
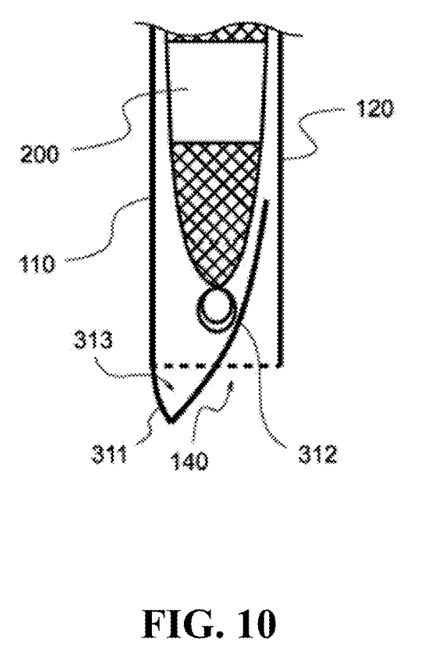
FIG. 10 is a schematic cross-sectional view of the vicinity of the tongue 310 (having tongue sub-portions 311, 312) in the second embodiment 300.

FIG. 9 is a partially enlarged view showing a second embodiment of the lure holder 300 of the present invention, and FIG. 10 is a schematic cross-sectional view of the vicinity of the tongue portion in the second lure holder embodiment 300. As in the case of the first lure holder embodiment 100, the first transparent plate 110 of the second lure holder embodiment 300, has a plurality of tongues 310. The tongue(s) 310 in the second embodiment 300, however, have a first portion 311, and a second, folded, portion 312.

The first portion 311 of the tongue 310 extends from the bottom edge 112 of the first transparent plate 110, and protrudes outside of opening 140. The second portion 312 is connected to the first portion 311, and the second portion 312 is folded back inside the opening 140 and the tube/cylinder of the lure holder 300 (that is, within the opposed transparent plates 110,120).

As a result, the connection between the first tongue portion 311 and the second tongue portion 312 at the base of the tongue 310 protrudes outside the tube of the lure holder 300, forming a hole/channel 313 leading to the outside of the lure holder 300. This hole/channel 313 allows the tongue 310 to easily discharge water from the inside of the lure holder 300. A lure 200 held within the lure holder 300 is easily washed with water, and the inside of the lure holder 300 tends to dry out.

Additionally, in the above description, a transparent material is exemplified as a preferable material for the first transparent plate 110 and the second transparent plate 120. Alternatively, the first plate portion 110 and/or the second plate portion 120 may be made of an opaque material.

Further, in the above description, resins represented by plastics are exemplified as a preferable material for the first transparent plate 110 and the second transparent plate 120. Alternatively, the first plate portion 110 and/or the second plate portion 120 may be made of other elastic materials, such as a thin sheet metal plate.

What is claimed is:

1. A lure holder, comprising:
   a first plate portion having an elongated plate shape with two longitudinal edges, and top and bottom end edges, and made of an elastic material;
   a second plate portion, opposite the first plate portion, and having an elongated plate shape with two longitudinal edges, and top and bottom end edges, and made of an elastic material, wherein the longitudinal edges of the first plate portion are connected to the opposite longitudinal edges of the second plate portion forming a tube having a width and a spindle-shaped cross section, open top and bottom ends defined by the respective top and bottom end edges of the plate portions, and an interior extending longitudinally between the top and bottom ends and the opposed plate portions; and a plurality of elastic tongues extending from one, but not both, of the bottom end edge of the first plate portion or the bottom end edge of the second plate portion, wherein the tongues each have an extended length greater than the tube width between the first and second plate portions, wherein the tongues are reversibly folded or foldable into the interior of the tube to be elastically retained or retainable therein against the opposite plate portion within the interior of the tube, and wherein the tongues, when so folded, do not block the open bottom end of the tube.

2. The lure holder according to claim 1, wherein the plurality of tongues is two tongues.

3. The lure holder according to claim 1, wherein at least one of the first plate portion and the second plate portion is made of a transparent resin material.

4. The lure holder according to claim 1, wherein the contour of the top end edge of the tube is inclined with respect to the longitudinal edge direction.

5. The lure holder according to claim 4, wherein the contour of the edge of the top opening forms a convex curve.

6. The lure holder according to claim 1, further comprising a fold line or cut line at a location where the tongues extend from the bottom end edge of the first plate portion or from the bottom end edge of the second plate portion of the tube.

7. The lure holder according to claim 1, wherein the tube is expandable by pressing the longitudinal edges of the spindle-shaped cross section of the tube closer together, thereby increasing curvature of the end edges of the plate portions.

8. The lure holder according to claim 7, wherein in the folded form, each of the plurality of tongues rotates with increasing curvature of the end edge of the plate portion to which it is attached, such that the tongues progressively overlap each other within the interior of the tube, increasing the collective rigidity of the tongues.

9. The lure holder according to claim 1, constructed from a single sheet of material.

10. The lure holder according to claim 9, wherein the material is overlapped along one of the connected longitudinal edges.

11. The lure holder according to claim 1, wherein each of the tongues have a first portion extending in the longitudinal direction to the outside of the tube, and a second portion, connected to the first portion, that is reversibly folded or foldable into the interior of the tube to be retained or retainable therein.

12. The lure holder according to claim 11, wherein in the folded form, the configuration of the connection of the first tongue portion and the second tongue portion provides a hole or channel outside of the tube that facilitates, in use of the lure holder, discharge of water from the lure holder.

13. The lure holder according to claim 11, wherein the tube is expandable by pressing the longitudinal edges of the spindle-shaped cross section of the tube closer together, thereby increasing curvature of the end edges of the plate portions.

14. The lure holder according to claim 11, wherein in the folded form, each of the plurality of tongues rotates with increasing curvature of the end edge of the plate portion to which it is attached, such that the tongues progressively overlap each other within the interior of the tube, increasing the collective rigidity of the tongues.

15. The lure holder according to claim 11, constructed from a single sheet of material.

16. The lure holder according to claim 15, wherein the material is overlapped along one of the connected longitudinal edges.

17. A kit or combination, comprising:
a container; and
at least one lure holder according to claim 1.

18. A kit or combination, comprising:
a lure holder according to claim 1; and
a lure contained therein.

* * * * *